US012112632B2

(12) United States Patent
Mugnai et al.

(10) Patent No.: US 12,112,632 B2
(45) Date of Patent: Oct. 8, 2024

(54) SYSTEMS AND METHODS FOR PROVIDING MULTI-CAMERA VEHICLE TRACKING AND NAVIGATION TO A VEHICLE LOCATION

(71) Applicant: Verizon Patent and Licensing Inc., Basking Ridge, NJ (US)

(72) Inventors: Tommaso Mugnai, Florence (IT); Marco Boschi, Ravenna (IT); Giovanni Pini, Florence (IT); Andrea Basile, Florence (IT); Francesco De Felice, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 18/055,628

(22) Filed: Nov. 15, 2022

(65) Prior Publication Data

US 2024/0161619 A1 May 16, 2024

(51) Int. Cl.
*G08G 1/14* (2006.01)

(52) U.S. Cl.
CPC .................................... *G08G 1/144* (2013.01)

(58) Field of Classification Search
CPC ...................................................... G08G 1/144
See application file for complete search history.

(56) References Cited

U.S. PATENT DOCUMENTS

2020/0003578 A1* 1/2020 Klinger .............. G01C 21/3661
2020/0175869 A1* 6/2020 Khoo ................... G08G 1/0141
2020/0211071 A1* 7/2020 Rosas-Maxemin .... G06N 20/00
2020/0302161 A1* 9/2020 Sriram .................... G06T 7/246

FOREIGN PATENT DOCUMENTS

CN 107507448 B * 2/2020 ........... G06Q 10/047
DE 112014005484 T5 * 8/2016 ......... G06Q 30/0284
JP 2013081013 A * 5/2013
KR 20210085615 A * 7/2021
KR 20220072789 A * 6/2022

* cited by examiner

*Primary Examiner* — Curtis A Kuntz
*Assistant Examiner* — James E Munion

(57) ABSTRACT

A device may receive a ticket identifier associated with a ticket, a vehicle identifier associated with a vehicle, and video data tracking the vehicle to a parking spot in a parking area. The device may process the video data, with models, to identify the parking spot and a parking spot location, and may associate the ticket identifier, the vehicle identifier, and the parking spot location. The device may receive a starting location of a user device associated with a user of the vehicle, and the ticket identifier based on the user scanning the ticket. The device may determine the parking spot location based on the ticket identifier, and may process the starting location and the parking spot location, with a path model, to calculate a navigation path from the starting location to the parking spot location. The device may provide the navigation path to the user device.

20 Claims, 11 Drawing Sheets

SYSTEMS AND METHODS FOR PROVIDING MULTI-CAMERA VEHICLE TRACKING AND NAVIGATION TO A VEHICLE LOCATION

BACKGROUND

Drivers may park their vehicles in a large parking area (e.g., associated with an airport, a train station, a supermarket, a mall, and/or the like) and may not remember locations of parking spots in which the vehicles were parked.

DETAILED DESCRIPTION OF EXAMPLE EMBODIMENTS

Figure 1A:
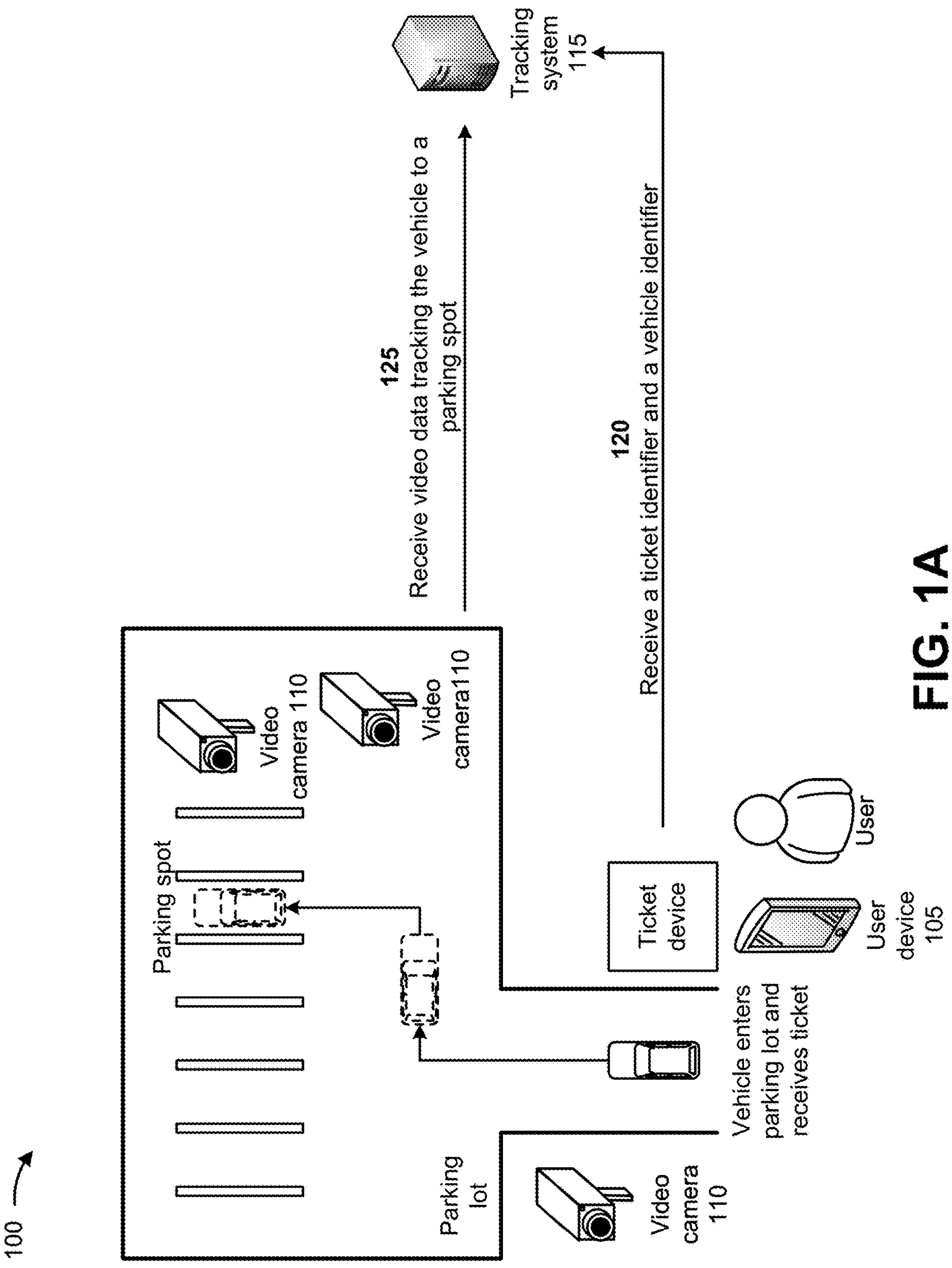
FIGS. 1A-1G are diagrams of an example implementation described herein.

The following detailed description of example implementations refers to the accompanying drawings. The same reference numbers in different drawings may identify the same or similar elements.

A vehicle may remain parked at a parking lot for a train station, an airport, and/or the like for many days, making it more difficult for a driver of the vehicle to remember the location of their parking spot. In many situations, it may not be possible for a driver to use a global positioning system (GPS) component of a user device (e.g., a smart phone) to locate a vehicle. For example, GPS is not useful when a parking area is located underground and there is no signal, or when the parking area is covered with poor signal transmission and reception. Furthermore, in order to utilize GPS to locate a vehicle in a parking area, the driver may execute a navigation application of the user device to save the GPS coordinates of the vehicle when parking, and may use the GPS coordinates to locate the vehicle at a later time. Therefore, current techniques for locating a vehicle in a parking area consume computing resources (e.g., processing resources, memory resources, and/or the like), networking resources, and/or the like associated with attempting to utilize GPS to unsuccessfully locate a vehicle in a parking area, executing a navigation application of a user device to unsuccessfully locate a vehicle in a parking area, utilizing parking area resources to locate a vehicle in the parking area, and/or the like.

Some implementations described herein relate to a tracking system that provides multi-camera vehicle tracking and navigation to a vehicle location. For example, the tracking system may receive a ticket identifier associated with a ticket and a vehicle identifier associated with a vehicle entering a parking area, and may receive video data tracking the vehicle to a parking spot in the parking area. The tracking system may process the video data, with an object detection model and a multiple object tracking model, to identify the parking spot and a parking spot location, and may associate the ticket identifier, the vehicle identifier, and the parking spot location. The tracking system may receive, after associating the ticket identifier, the vehicle identifier, and the parking spot location, a starting location of a user device associated with a user of the vehicle, and may receive the ticket identifier based on the user scanning the ticket with the user device. The tracking system may determine the parking spot location based on the ticket identifier and associating the ticket identifier, the vehicle identifier, and the parking spot location, and may process the starting location and the parking spot location with a path model in order to calculate a navigation path from the starting location to the parking spot location. The tracking system may provide the navigation path to the user device once the user has scanned the ticket with their user device.

In this way, the tracking system provides multi-camera vehicle tracking and navigation to a vehicle location. The tracking system may utilize video data from video cameras (e.g., surveillance cameras) of a parking area to match a license plate of a vehicle with a ticket identifier for parking, and to track the vehicle to a parking spot. The tracking system may associate the license plate, the ticket identifier, and a location of the parking spot and may store the association. When a driver of the vehicle returns to the parking area to retrieve the vehicle, the tracking system may detect a starting location of a driver's user device and may receive the ticket identifier. The tracking system may then utilize the location of the parking spot associated with the ticket identifier as a destination and may calculate a navigation path from the starting location to the destination location (e.g., the vehicle location in the parking spot). The tracking system may provide the navigation path to the user device so that the driver may follow the navigation path to the vehicle location in the parking spot. This, in turn, conserves computing resources, networking resources, and/or the like that would otherwise have been consumed in attempting to utilize GPS to unsuccessfully locate a vehicle in a parking area, executing a navigation application of a user device to unsuccessfully locate a vehicle in a parking area, utilizing parking area resources to locate a vehicle in the parking area, and/or the like.

FIGS. 1A-1G are diagrams of an example 100 associated with providing multi-camera vehicle tracking and navigation to a vehicle location. As shown in FIGS. 1A-1G, example 100 includes a vehicle driven by a user associated with a user device 105, video cameras 110 associated with a parking area (e.g., a parking lot with a ticket device and parking spots) in which the vehicle is to park, and a tracking system 115. The tracking system 115 may include a system that provides multi-camera vehicle tracking and navigation to a vehicle location. Further details of the user device 105, the video cameras 110, and the tracking system 115 are provided elsewhere herein. Although the figures depict three video cameras 110, in some implementations, fewer or more video cameras 110 may be associated with the tracking system 115 and may be deployed at various locations of the parking area.

As shown in FIG. 1A, and by reference number 120, the tracking system 115 may receive a ticket identifier and a vehicle identifier associated with the vehicle entering the parking area. For example, the vehicle may enter the parking area and a driver (or a passenger) of the vehicle may receive a ticket from a ticket device (e.g., a kiosk). The ticket may include a ticket identifier (e.g., a code, a barcode, a quick response (QR) code, and/or the like) that identifies the ticket and a time when the vehicle entered the parking area. The vehicle may include a vehicle identifier, such as license plate number, a vehicle identification number (VIN), an identifier associated with a vehicle device (e.g., a vehicle entertainment system, a GPS of the vehicle, sensors, such as an accelerometer of the vehicle, etc.), and/or the like. The tracking system 115 may receive the ticket identifier from the ticket device and may receive the vehicle identifier from video captured by one or more of the video cameras 110, from the ticket device, from the vehicle device, and/or the like.

As further shown in FIG. 1A, and by reference number 125, the tracking system 115 may receive video data tracking the vehicle to a parking spot in the parking area. For example, the video cameras 110 may capture image frames and audio (e.g., the video data) of the vehicle as the vehicle travels through the parking area to the parking spot in real-time. In some implementations, the video cameras 110 may provide the video data to the tracking system 115 in real-time rather than or in addition to storing the video data in a data structure (e.g., a database, a table, a list, and/or the like). The tracking system 115 may receive the video data, tracking the vehicle to the parking spot in the parking area, from the video cameras 110 (e.g., one or more video cameras 110). In some implementations, the tracking system 115 may continuously receive the video data from the video cameras 110, may periodically receive the video data from the video cameras 110, may receive the video data from the video cameras 110 based on providing requests for the video data to the video cameras 110, and/or the like. In some implementations, the tracking system 115 may store the video data in a data structure associated with the tracking system 115.

Figure 1B:
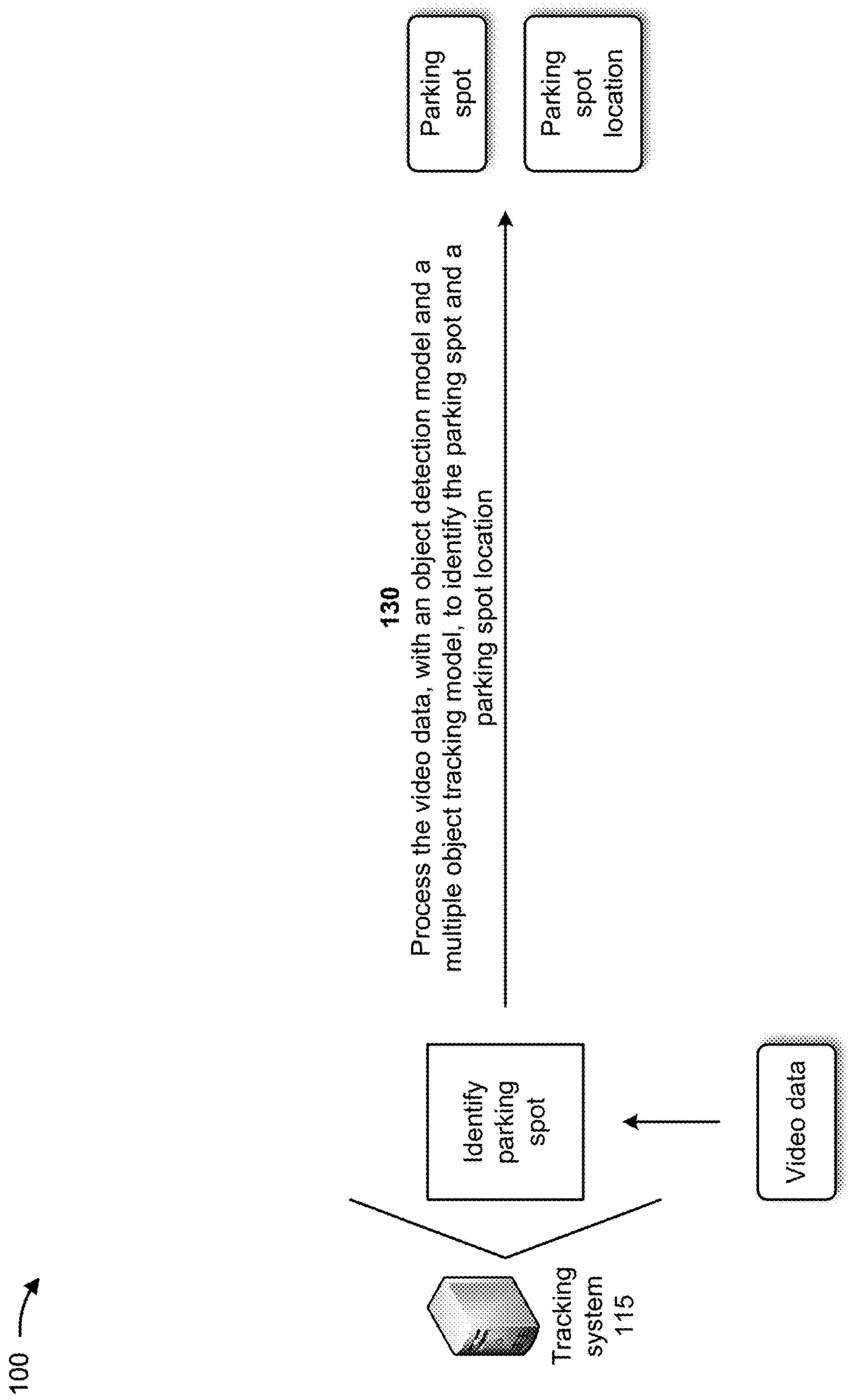

As shown in FIG. 1B, and by reference number 130, the tracking system 115 may process the video data, with an object detection model and a multiple object tracking model, to identify movement of the vehicle throughout the parking area, until the vehicle reaches a particular parking spot and identifies and stores a location of the parking spot location within the parking area. For example, tracking the vehicle from an entrance of the parking area to the parking spot may occur across multiple video cameras 110, starting from a video camera 110 at the entrance of the parking area (e.g., which captures the vehicle identifier, such as the license plate) to other video cameras 110 in the parking area. Tracking the vehicle via a single video camera 110 may be performed with computer vision models, such as an object detection model (e.g., a deep neural network model, such as a convolution neural network (CNN) model) and then a multiple object tracking model (e.g., to handle a possibility of multiple vehicles moving at the same time). This may result in a temporal sequence of areas (e.g., rectangular bounding boxes) for each video frame that includes the vehicle. A temporal sequence of areas may be referred to as a track.

To complete a tracking process, the tracking system 115 may combine tracks from different video cameras 110 to follow the vehicle as it exits a field of view of one video camera 110 and enters a field of view of a next video camera 110. The tracking system 115 may utilize one or more techniques to combine the tracks from different video cameras 110. For example, the tracking system 115 may utilize geometrics constraints between positions of video cameras 110 (e.g., a vehicle exiting a field of view of a first video camera 110 on a right side of a video may appear in a field of view of a second video camera 110 after about 1.2 seconds on a left side of the video or may appear at a bottom of a video captured by a third video camera 110 while still visible in the field of view of the first video camera 110). The tracking system 115 may utilize visual features (e.g., colors, shapes, and/or the like) of the vehicle to combine tracks. Such features may be extracted from the video (e.g., using the CNN model that detected the vehicle) and may represent content of the video, or a portion thereof, in a compact way. The tracking system 115 may also utilize the features to identify an unexpected behavior (e.g., a video camera 110 has been rotated without updating the tracking system 115 so constraints associated with the video camera 110 are not working as expected).

The tracking system 115 may identify the parking spot location where the vehicle has stopped (e.g., for a threshold period of time indicating that the vehicle has parked) by identifying which of the video cameras 110 recorded the vehicle stopping. The tracking system 115 may utilize a position of the identified video camera 110 in the parking area, a field of view of the identified video camera 110, lens parameters of the identified video camera 110, and/or the like to geometrically determine a stopping location of the vehicle (e.g., the location of the parking spot). In some implementations, each of the video cameras 110 may include a machine learning model that performs tracking for all vehicles in the field of view and, based on positional constraints, provides information about camera positions and/or features to other video cameras 110. In such implementations, the tracking system 115 may store (e.g., in a data structure) a mapping or an association of the ticket identifier, the vehicle identifier, and the parking spot location once the vehicle is parked. In some implementations, if the video cameras 110 include edge computing capabilities, the vehicle tracking may be aided by linking together the video cameras 110 and dashboard-mounted cameras (dashcams) provided in vehicles.

Figure 1C:
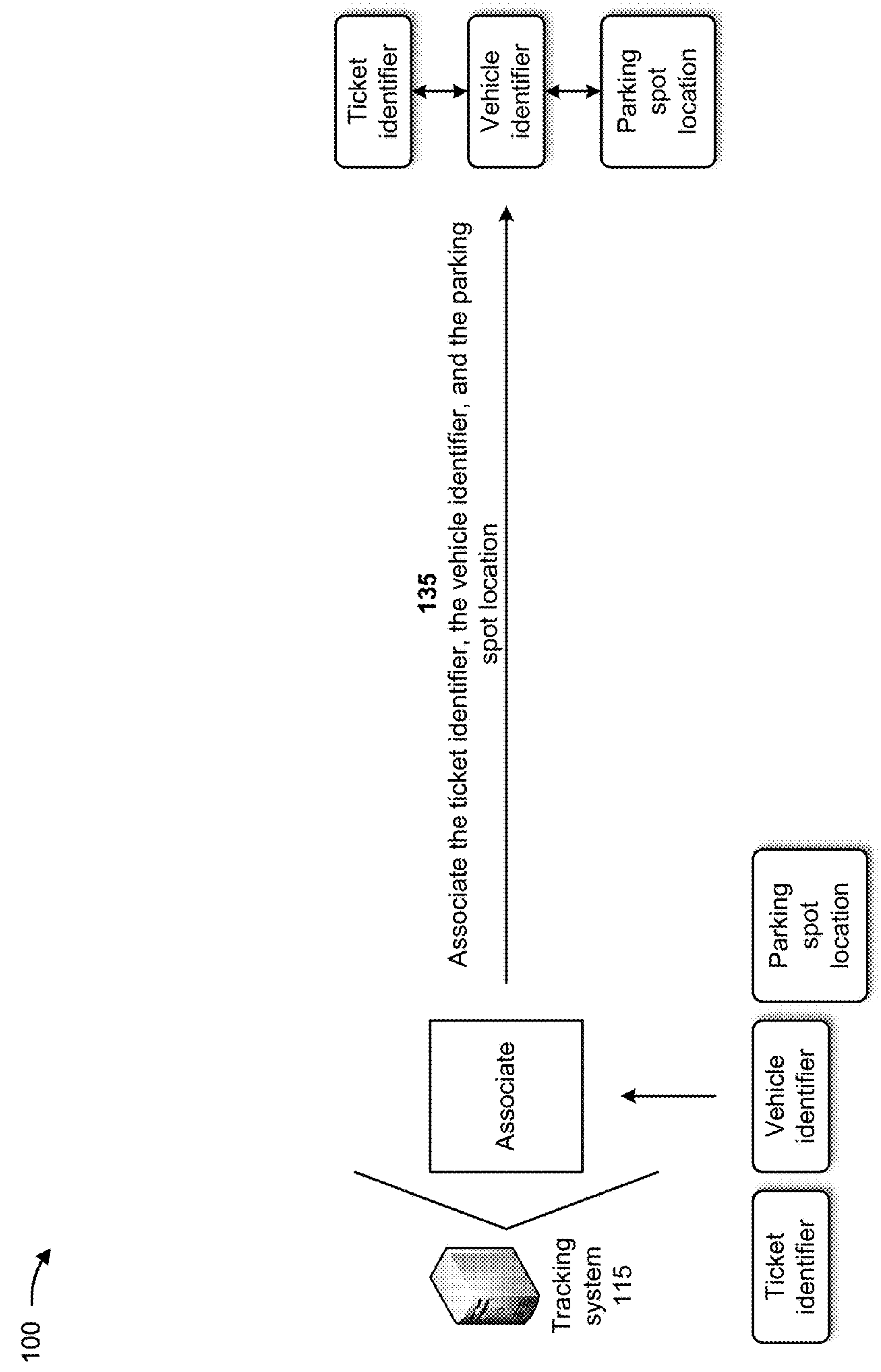

As shown in FIG. 1C, and by reference number 135, the tracking system 115 may associate the ticket identifier, the vehicle identifier, and the parking spot location. For example, the tracking system 115 may map or associate the ticket identifier, the vehicle identifier, and the parking spot location and may store the association of the ticket identifier, the vehicle identifier, and the parking spot location in a data structure associated with the tracking system 115.

Figure 1D:
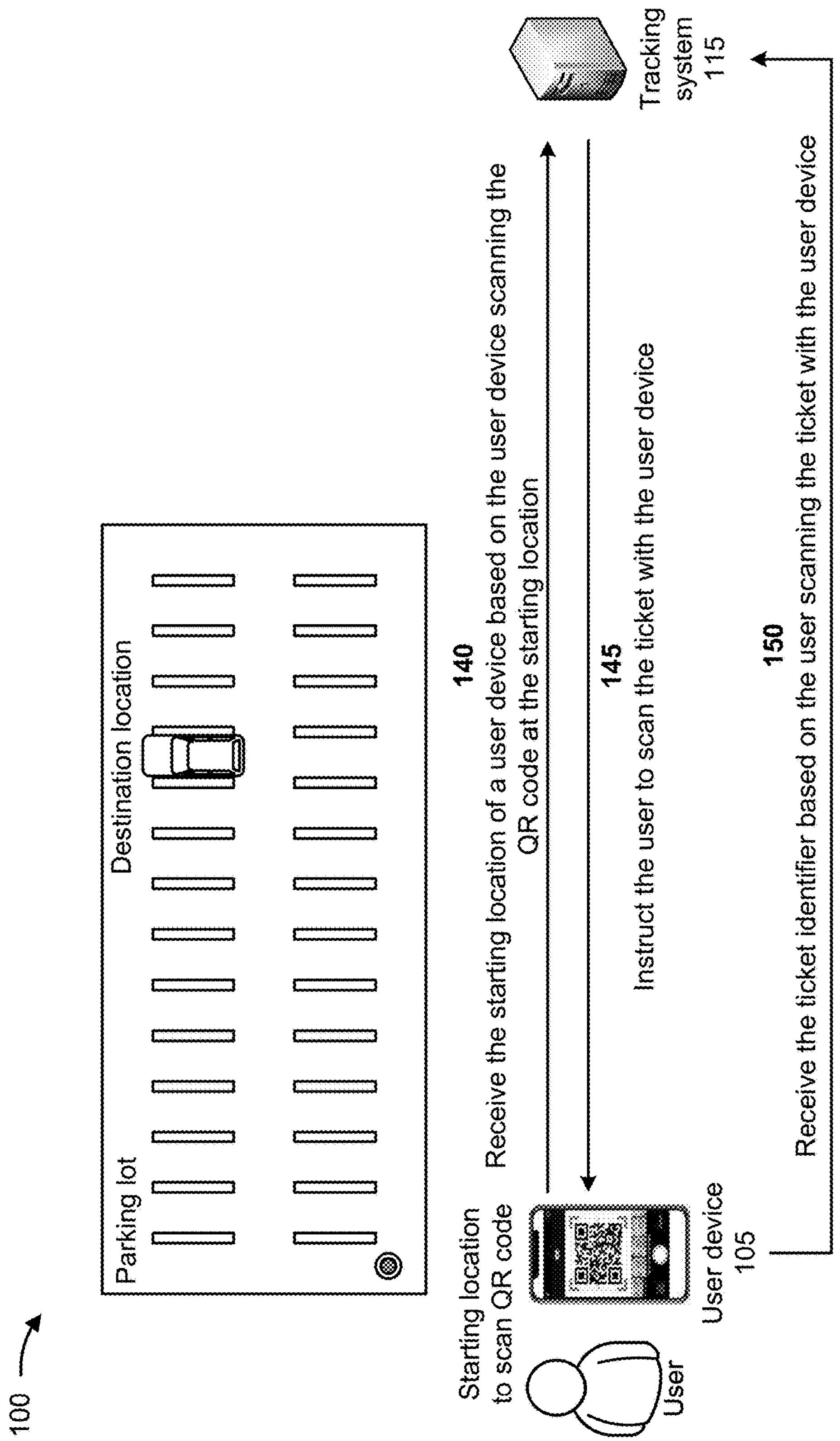

As shown in FIG. 1D, and by reference number 140, the tracking system 115 may receive the starting location of the user device 105 based on the user device 105 scanning a code (e.g., a QR code, a barcode, and/or the like) at the starting location. For example, when the user returns to the parking area to retrieve the vehicle, the user may enter the parking area at a particular location of the parking area. In some implementations, the particular location may correspond to the starting location and may include a display (e.g., a sign, a display of a device, a banner, and/or the like) that includes the code and instructions for the user to scan the code with the user device 105. The user may utilize the user device 105 to scan the code, and the user device 105 may provide the code to the tracking system 115. The tracking system 115 may receive the code and may compare the code with particular locations of codes displayed in the parking area. The tracking system 115 may determine the starting location of the user device 105 based on comparing the code with the particular locations of codes displayed in the parking area. The starting location may be obtained by scanning a code located at one of several locations of the parking area, such as ticket points, entrances, doors, and/or the like. By scanning the code, an application of the user device 105 may immediately determine the starting location and may provide the starting location to the tracking system 115.

Alternatively, or additionally, if the user does not have a user device 105, the particular location of the parking area may include machine or kiosk for scanning the ticket. The user may insert the ticket in the machine or kiosk, and the machine or kiosk may provide, to the tracking system 115, a location of the machine or kiosk as the starting location of the user.

As further shown in FIG. 1D, and by reference number 145, the tracking system 115 may instruct the user to scan the ticket with the user device 105. For example, after receiving the starting location of the user device 105, the tracking system 115 may provide, to the user device 105, instructions that instruct the user to scan the ticket (e.g., scan the ticket identifier) with the user device 105. The user device 105 may display the instructions to the user, and the user may utilize the user device 105 to scan the ticket. Upon scanning the ticket, the user device 105 may receive the ticket identifier of the ticket. In some implementations, the user device 105 may include an application that enables the user device 105 to scan the ticket. Alternatively, or additionally, the user may utilize the user device 105 to enter the ticket identifier, and the user device 105 may provide the ticket identifier to the tracking system 115.

As further shown in FIG. 1D, and by reference number 150, the tracking system 115 may receive the ticket identifier based on the user scanning the ticket with the user device 105. For example, upon scanning the ticket, the user device 105 may provide the ticket identifier to the tracking system 115. The tracking system 115 may receive, from the user device 105, the ticket identifier based on the user scanning the ticket with the user device 105.

Figure 1E:
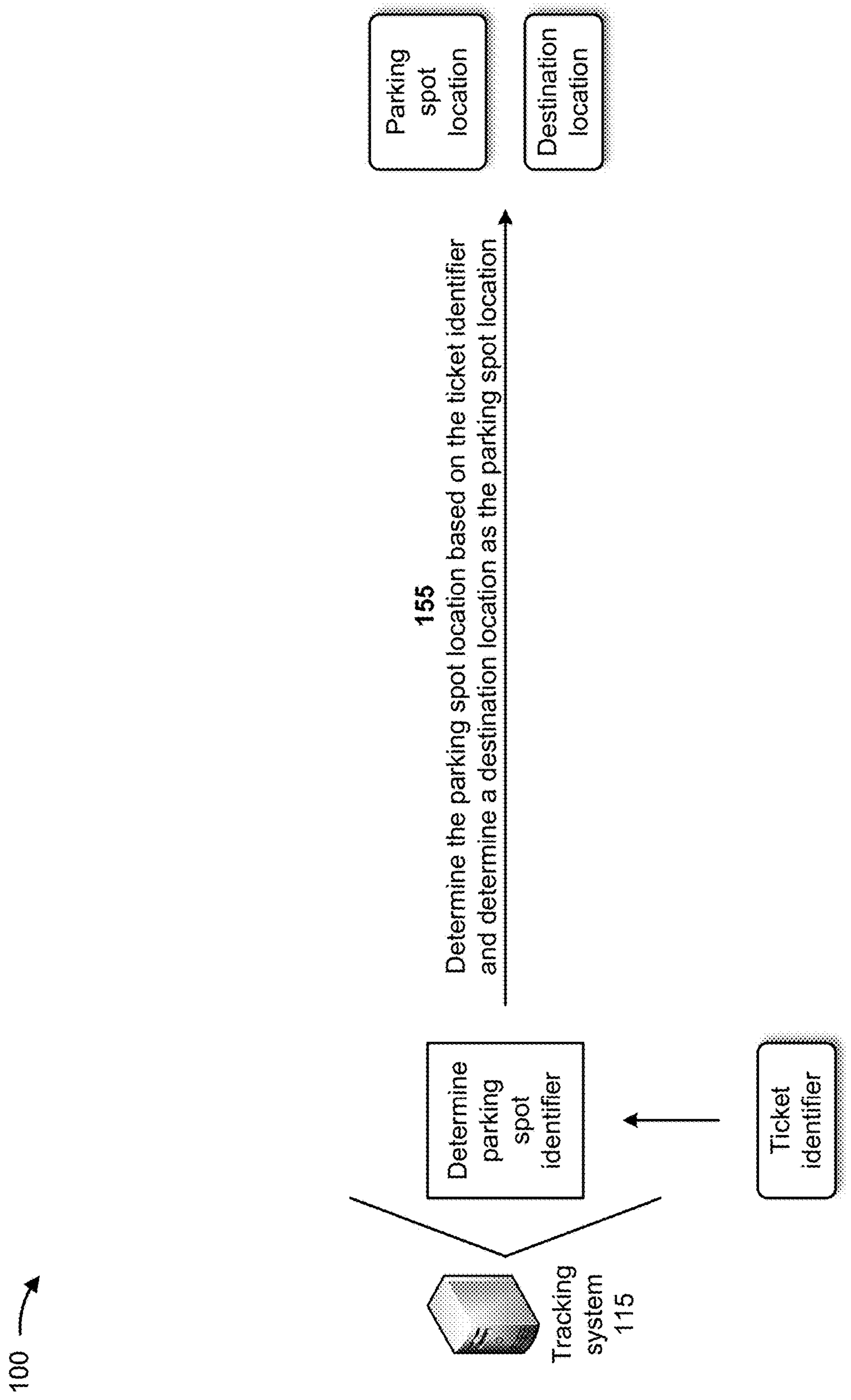

As shown in FIG. 1E, and by reference number 155, the tracking system 115 may determine the parking spot location based on the ticket identifier and may determine a destination location as the parking spot location. For example, the tracking system 115 may compare the ticket identifier with ticket identifiers stored in the data structure associated with the tracking system 115. Once the ticket identifier is identified in the data structure, the tracking system 115 may utilize the association of the ticket identifier, the vehicle identifier, and the parking spot location in the data structure to determine the parking spot location of the vehicle. The tracking system 115 may determine the destination location (e.g., for generating a navigation path from the starting location to the destination location) as the parking spot location.

Figure 1F:
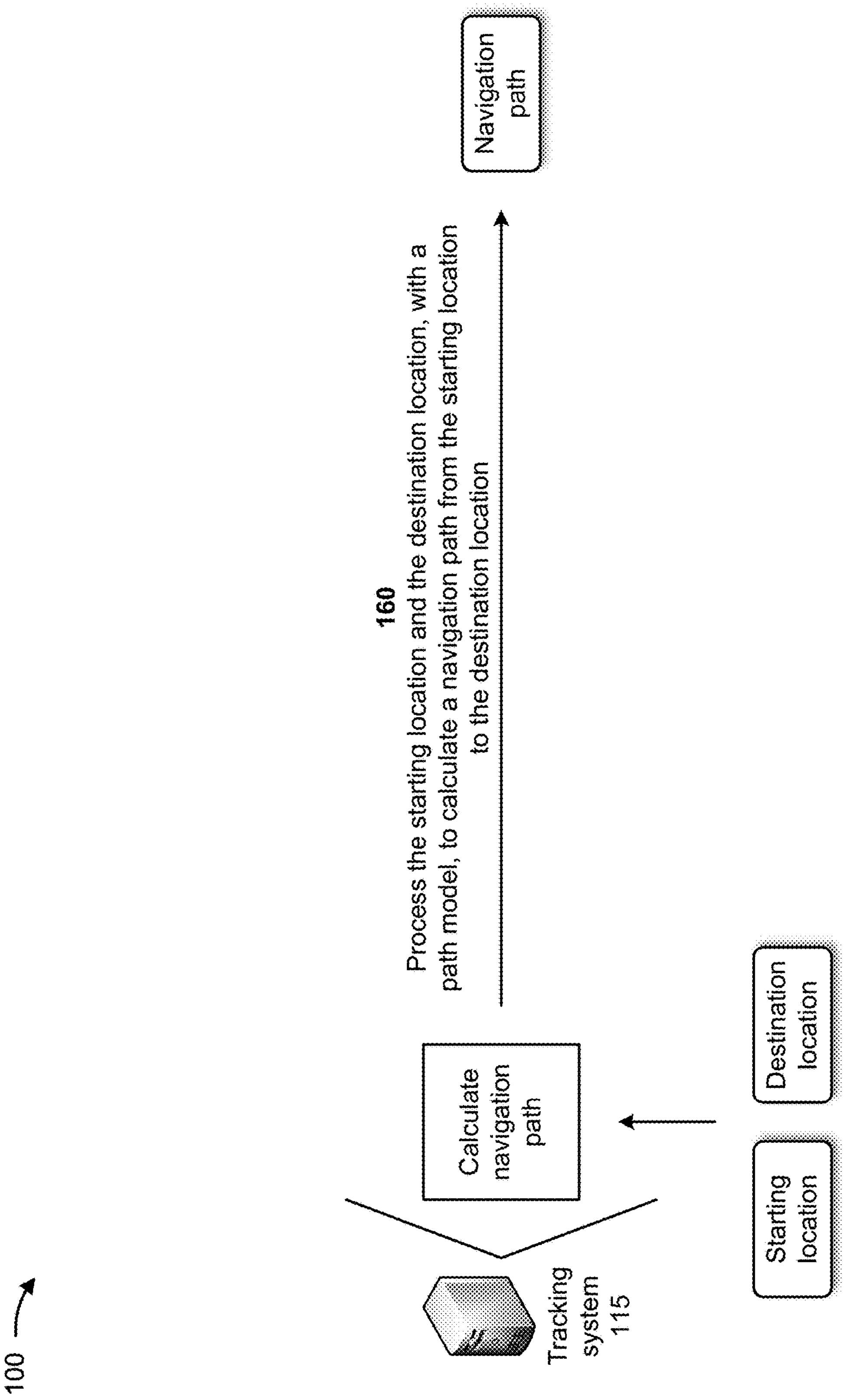

As shown in FIG. 1F, and by reference number 160, the tracking system 115 may process the starting location and the destination location, with a path model, to calculate a navigation path from the starting location to the destination location. For example, the tracking system 115 may process the starting location, the destination location, and features of the parking area (e.g., stairs, levels, wheelchair accessibility, color coding, and/or the like), with the path model, to calculate the navigation path from the starting location to the destination location. The navigation path may include a map showing the navigation path to the parking spot where the user's vehicle is parked.

In some implementations, the tracking system 115 may generate the navigation path based on a graph of the parking area stored in the data structure associated with the tracking system 115. The graph may include a list of nodes, such as a list of points (e.g., locations) associated with each parking spot in the parking area and any relevant turns, entrances, exits, arches, and/or the like (e.g., a list of lines that a user may follow to move from one point to another point). Each arch may represent roads, stairs, escalators, elevators, ramps, and/or the like, which enables the overall map of the parking area to span multiple floors. The list of nodes and arches may be preconfigured in the data structure of the tracking system 115 by a system configurator via a user interface (e.g., a parking manager user interface) that enables the system configurator to draw points and lines over a map of the parking area.

The tracking system 115 may process the starting location, the destination location, and the graph, with the path model, to calculate the navigation path from the starting location to the destination location. The path model may include a model that calculates a best path between the starting location and the destination location, such as Dijkstra's model that calculates the best path (e.g., on the map) between the starting location and the destination location.

Alternatively, or additionally, if the user does not have a user device 105, the particular location of the parking area may include machine or kiosk for scanning the ticket. The user may insert the ticket in the machine or kiosk, and the machine or kiosk may provide, to the tracking system 115, a location of the machine or kiosk as the starting location of the user. The tracking system 115 may utilize this starting location to calculate the navigation path from the starting location to the destination location, and may provide the navigation path to the machine or kiosk. The machine or kiosk may print and/or display the navigation path (e.g., the map) to the user, with suggestions based on colors, numbers, and/or letters associated with a specific area of the parking spot or a group of parking spots.

Figure 1G:
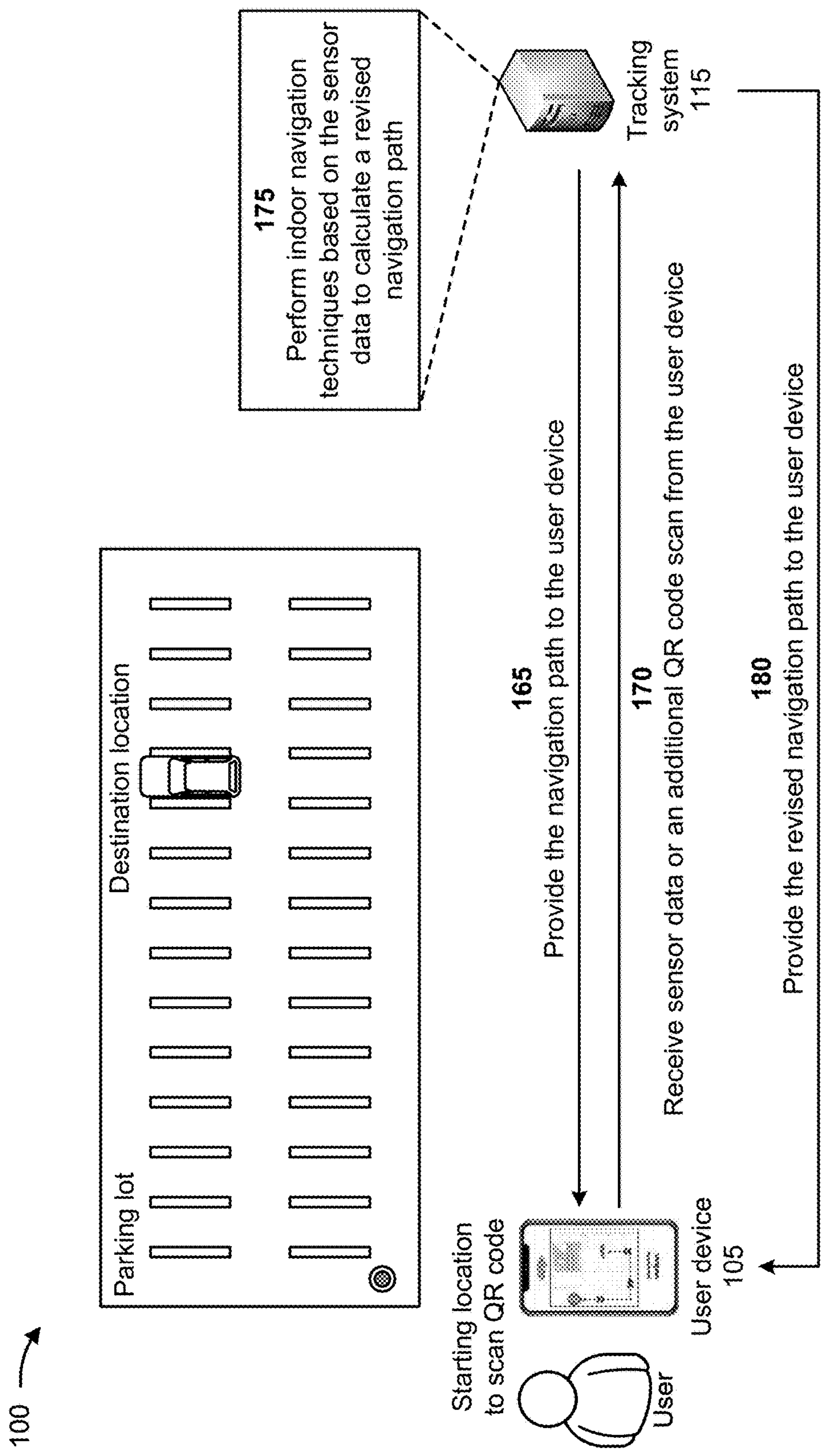

As shown in FIG. 1G, and by reference number 165, the tracking system 115 may provide the navigation path to the user device 105. For example, the tracking system 115 may generate a user interface that includes the navigation path (e.g., the map), and may provide the user interface to the user device 105. The user device 105 may display the user interface with the navigation path to the user and the user may utilize the navigation path to locate the vehicle in the parking area.

The navigation path may include an image with lines and arrows, the image integrated with step-by-step textual or audible instructions, and/or the like. In implementations, the navigation path may be augmented with information associated with the parking spot (e.g., a parking spot number, a color code), names of entrances, names of exits, and/or the like. A multi-floor navigation path may be provided to the user device 105 and may include ways of navigating from one floor to another floor using the user interface. In some implementations, if indoor navigation is available via sensors (e.g., the accelerometer) of the user device 105, a current position of the user device 105 may be displayed in real-time on the navigation path so that it will be easier for the user to follow the navigation path to the parking spot location.

As further shown in FIG. 1G, and by reference number 170, the tracking system 115 may receive sensor data (e.g., accelerometer data) or an additional QR code scan from the user device 105. For example, instead of using a static navigation path (e.g., a static map), an accelerometer of the user device 105 may generate sensor data and may provide the sensor data to the tracking system 115. The tracking system 115 may receive the sensor data from the user device 105. Alternatively, or additionally, the user may utilize the user device 105 to scan one or more codes (e.g., QR codes) located along the navigation path. The user device 105 may provide the scanned codes to the tracking system 115, and the tracking system 115 may receive the scanned codes from the user device 105.

As further shown in FIG. 1G, and by reference number 175, the tracking system 115 may perform indoor navigation techniques based on the sensor data to calculate a revised navigation path. For example, the tracking system 115 may utilize the sensor data (or the scanned codes) to estimate a current position of the user device 105 along the navigation path. The tracking system 115 may perform indoor navigation techniques based on the sensor data (or the scanned codes) to track the current location of the user device 105 and to calculate the revised navigation path. In some implementations, the indoor navigation techniques may utilize adjustments (e.g., adaptive Kalman filters) to handle any errors associated with the sensor data. In some implementations, the tracking system 115 may utilize the scanned codes to revise the navigation path and to provide a more accurate position of the user devices along the navigation path.

As further shown in FIG. 1G, and by reference number 180, the tracking system 115 may provide the revised navigation path to the user device 105. For example, the tracking system 115 may generate a revised user interface that includes the revised navigation path (e.g., a revised map), and may provide the revised user interface to the user device 105. The user device 105 may display the revised user interface with the revised navigation path to the user and the user may utilize the revised navigation path to locate the vehicle in the parking area. The revised navigation path may include the features described above in connection with the navigation path.

In some implementations, the parking area may include video cameras 110 covering the entire parking area, and no additional video cameras 110 would be required to capture the video data. In some implementations, a high quality video camera 110 may be provided at the entrance of the parking area to detect the license plates of vehicles for identification purposes. The tracking system 115 may not require long-term data retention, which may simplify compliance with regulations. The video data is recorded when a vehicle enters the parking area until the vehicle is stopped in the parking spot. When the driver returns to the parking area, pays and exits the parking area, the tracking system 115 may delete the video data recorded for the vehicle and the data calculated for the vehicle.

In some implementations, the tracking system 115 may be utilized in other scenarios. For example, the tracking system 115 may automatically alert an owner of the parking area of any possibly dangerous situations occurring in the parking area. Since the tracking system 115 processes the video data to track vehicles, the tracking system 115 may perform additional analyses to detect dangerous behavior from people and/or vehicles (e.g., crashes). The tracking system 115 may determine which parking spots are utilized and may determine which areas have the most available parking spots. Based on these determinations, the tracking system 115 may provide parking spot suggestions to entering vehicles via the tickets. If the behavior of customers is known via the tracking system 115, a parking area manager may understand which areas are used more for parking, and may determine improvements for the parking area based on the understanding. The tracking system 115 may enable drivers to request a specific exit from the parking area instead of following signs provided in the parking area that lead to a closer exit (e.g., when a driver doesn't want a closer exit, but rather an exit in front of a cafe). In some implementations, one or more of the video cameras 110 may include computing resources to perform the functions described herein as being performed by the tracking system 115. In some implementations, one or more of the video cameras 110 may communicate with user devices 105 and may be utilized to perform the indoor navigation techniques. In some implementations, a ticket may not be utilized, but rather a vehicle license plate (or VIN) may be captured at the entrance and no ticket may be provided. In this situation, the tracking system 110 may perform the functions described herein with the only difference being that to locate the vehicle (e.g., and also to pay for parking) the tracking system 110 may utilize the vehicle's license plate.

In some implementations, the tracking system 115 may be utilized in offices that require a badge to access the premises. In such an environment, the tracking system 115 may navigate people to a desk and other employees may receive a location of a colleague. This may be especially useful if desks are not personal but employees can choose any available desk. In some implementations, the tracking system 115 may be utilized with a connected city. In such an environment, the tracking system 115 may track vehicles moving within the city via surveillance or traffic video cameras. The traffic system 115 may utilize a license plate number to determine a last known location of a vehicle or to study traffic behavior more accurately (e.g., which may enable improvements to the road network).

In this way, the tracking system 115 provides multi-camera vehicle tracking and navigation to a vehicle location. The tracking system 115 may utilize video data from video cameras 110 (e.g., surveillance cameras) of a parking area to match a license plate of a vehicle with a ticket identifier for parking, and to track the vehicle to a parking spot. The tracking system 115 associate the license plate, the ticket identifier, and a location of the parking spot and may store the association. When a driver of the vehicle returns to the parking area to retrieve the vehicle, the tracking system 115 may detect a starting location of a user device 105 of the driver and may receive the ticket identifier. The tracking system 115 may utilize the location of the parking spot associated with the ticket identifier as a destination and may calculate a navigation path from the starting location to the destination location (e.g., the vehicle location in the parking spot). The tracking system 115 may provide the navigation path to the user device 105 so that the driver may follow the navigation path to the vehicle location in the parking spot. This, in turn, conserves computing resources, networking resources, and/or the like that would otherwise have been consumed in attempting to utilize GPS to unsuccessfully locate a vehicle in a parking area, executing a navigation application of a user device 105 to unsuccessfully locate a vehicle in a parking area, utilizing parking area resources to locate a vehicle in the parking area, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
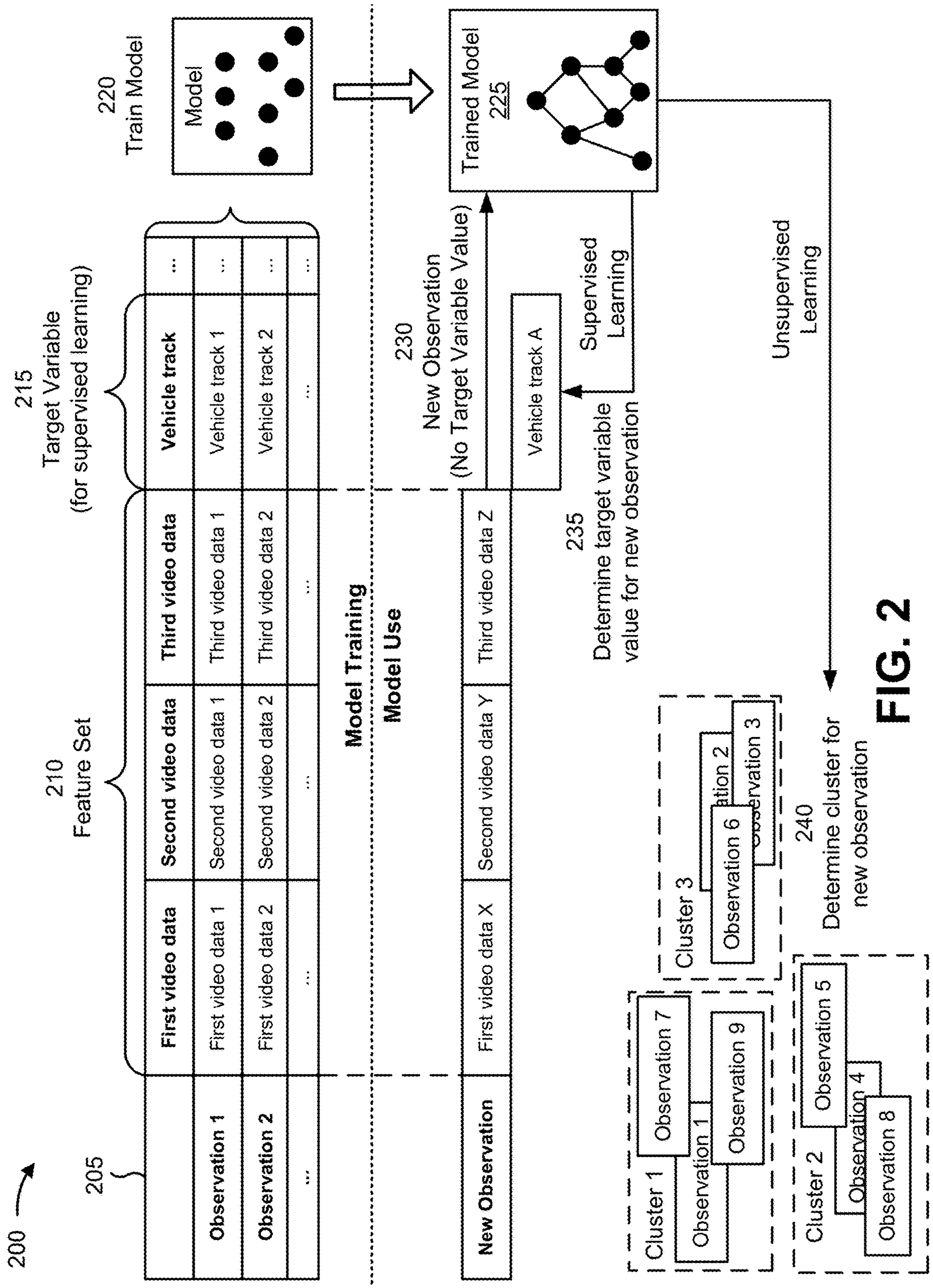
FIG. 2 is a diagram illustrating an example of training and using a machine learning model.

FIG. 2 is a diagram illustrating an example 200 of training and using a machine learning model for tracking a vehicle path based on video data. The machine learning model training and usage described herein may be performed using a machine learning system. The machine learning system may include or may be included in a computing device, a server, a cloud computing environment, and/or the like, such as the tracking system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the tracking system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the tracking system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of first video data, a second feature of second video data, a third feature of third video data, and so on. As shown, for a first observation, the first feature may have a value of first video data 1, the second feature may have a value of second video data 1, the third feature may have a value of third video data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a vehicle track and may include a value of vehicle track 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first video data X, a second feature of second video data Y, a third feature of third video data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of vehicle track A for the target variable of the vehicle track for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second video data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to track a vehicle path based on video data. The machine learning system enables recognition and/or identification of tens, hundreds, thousands, or millions of features and/or feature values for tens, hundreds, thousands, or millions of observations, thereby increasing accuracy and consistency and reducing delay associated with tracking a vehicle path based on video data relative to requiring computing resources to be allocated for tens, hundreds, or thousands of operators to manually track a vehicle path based on video data.

As indicated above, FIG. 2 is provided as an example. Other examples may differ from what is described in connection with FIG. 2.

Figure 3:
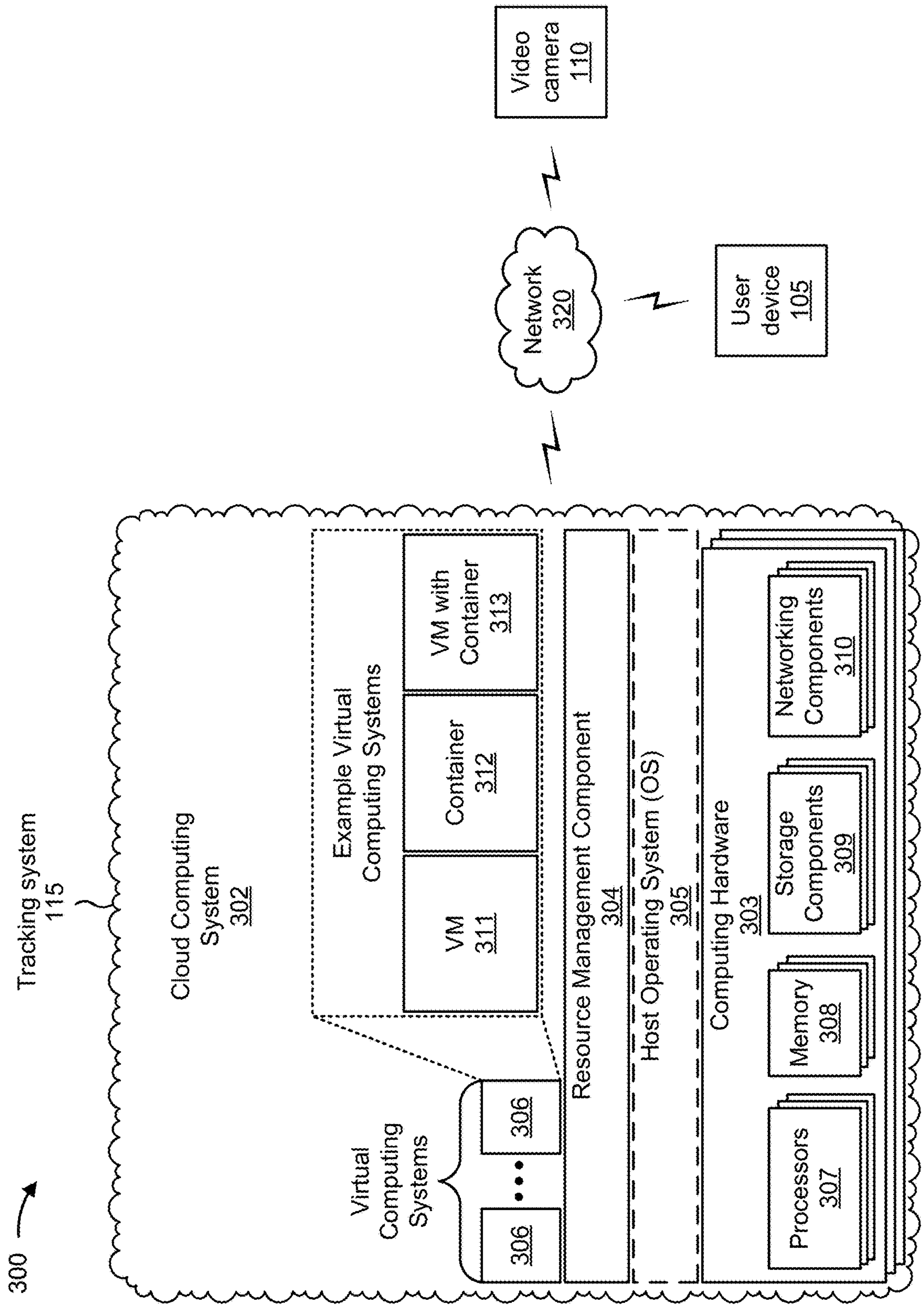
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a tracking system 115, which may include one or more elements of and/or may execute within a cloud computing system 302. The cloud computing system 302 may include one or more elements 303-313, as described in more detail below. As further shown in FIG. 3, the environment 300 may include the user device 105, the video camera 110, and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The video camera 110 may include one or more devices capable of receiving, generating, storing, processing, providing, and/or routing information, as described elsewhere herein. The video camera 110 may include a communication device and/or a computing device. For example, the video camera 110 may include an optical instrument that captures videos (e.g., images and audio). The video camera 110 may feed real-time video directly to a screen or a computing device for immediate observation, may record the captured video (e.g., images and audio) to a storage device for archiving or further processing, and/or the like. The recorded video may be utilized for surveillance and monitoring tasks in which unattended recording of a situation is required for later analysis.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the tracking system 115 may include one or more elements 303-313 of the cloud computing system 302, may execute within the cloud computing system 302, and/or may be hosted within the cloud computing system 302, in some implementations, the tracking system 115 may not be cloud-based (e.g., may be implemented outside of a cloud computing system) or may be partially cloud-based. For example, the tracking system 115 may include one or more devices that are not part of the cloud computing system 302, such as device 400 of FIG. 4, which may include a standalone server or another type of computing device. The tracking system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
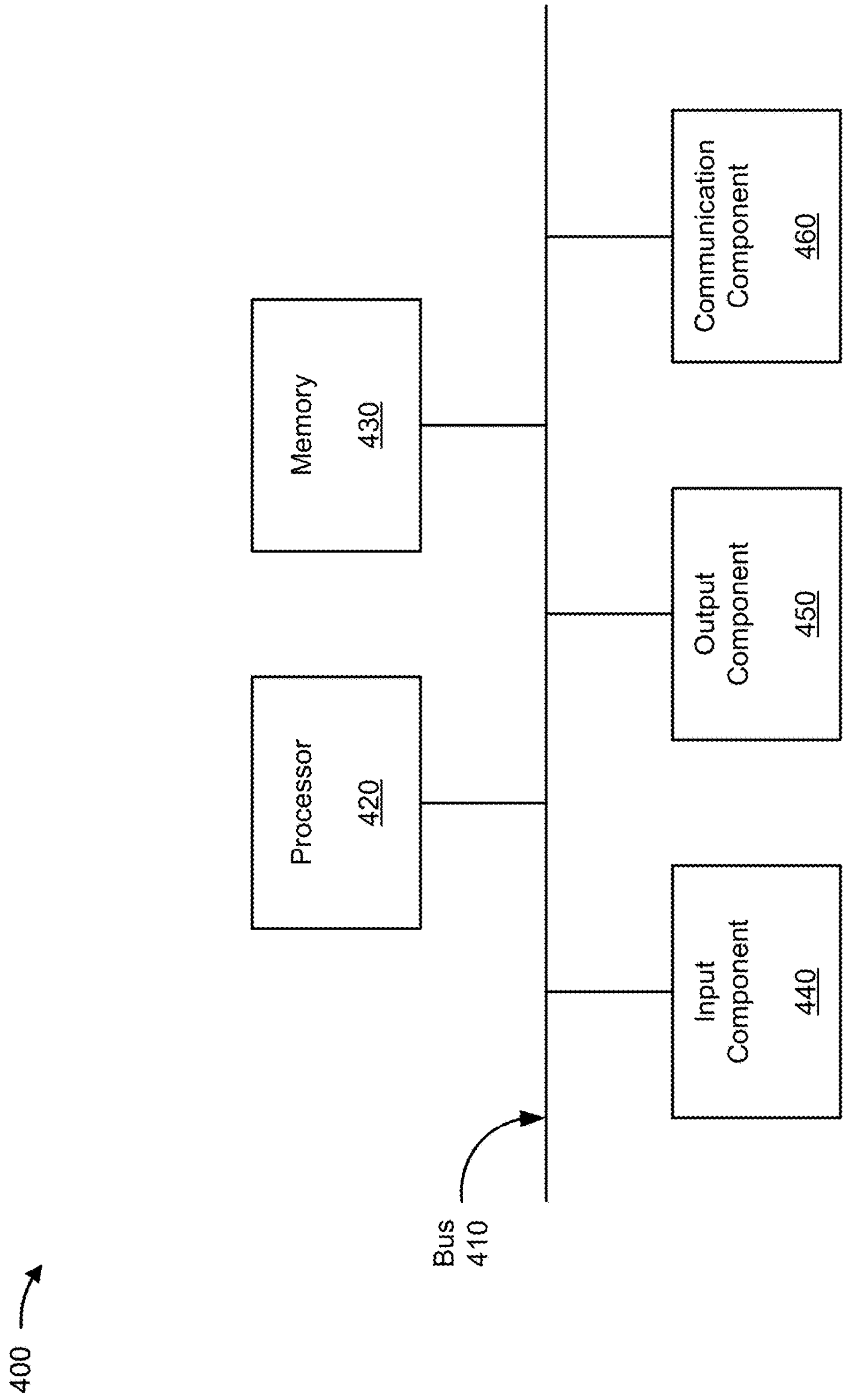
FIG. 4 is a diagram of example components of one or more devices of FIG. 3.

FIG. 4 is a diagram of example components of a device 400, which may correspond to the user device 105, the video camera, and/or the tracking system 115. In some implementations, the user device 105, the video camera, and/or the tracking system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
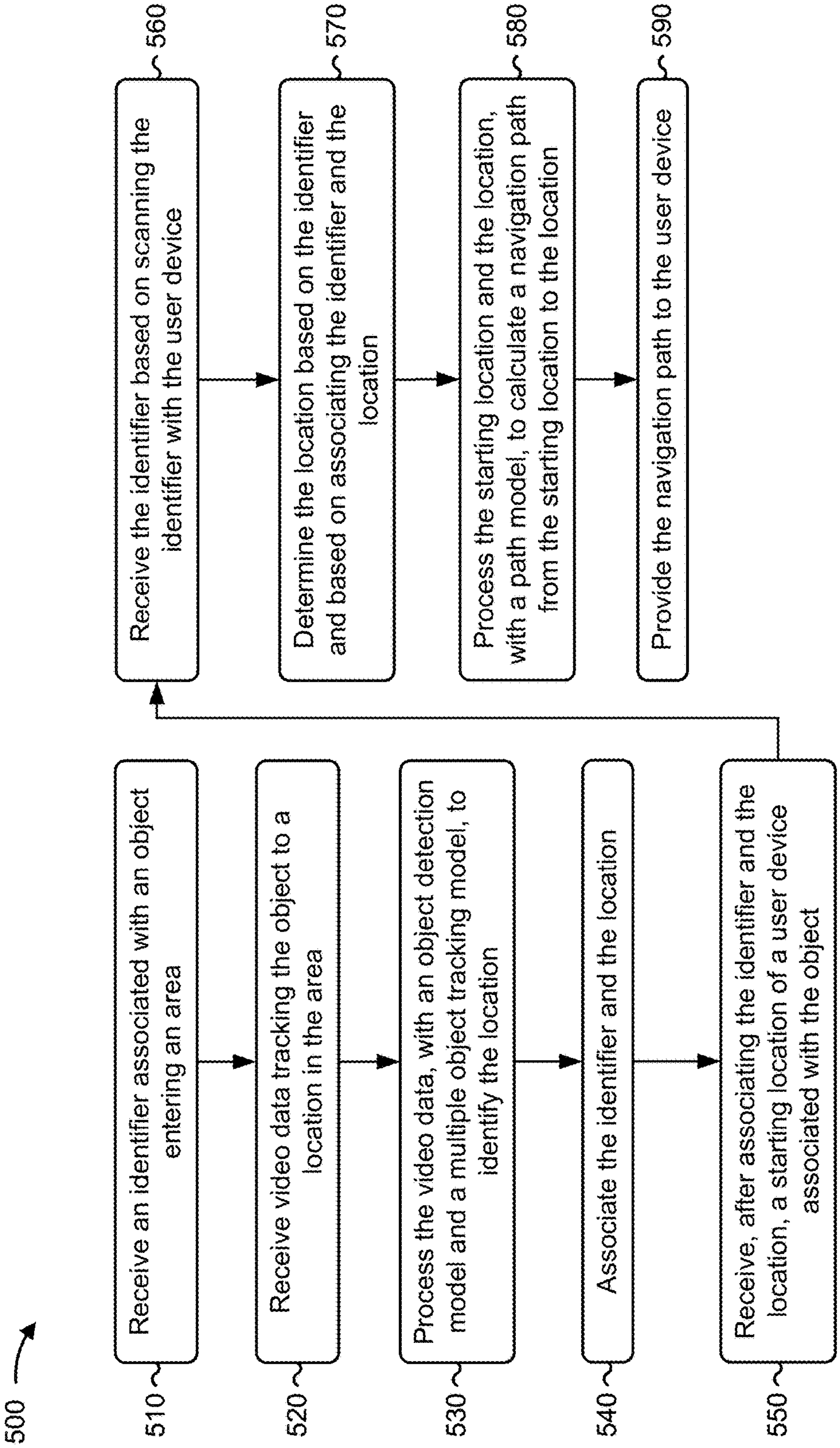
FIG. 5 is a flowchart of an example process for providing multi-camera vehicle tracking and navigation to a vehicle location.

FIG. 5 is a flowchart of an example process 500 for providing multi-camera vehicle tracking and navigation to a vehicle location. In some implementations, one or more process blocks of FIG. 5 may be performed by a device (e.g., the tracking system 115). In some implementations, one or more process blocks of FIG. 5 may be performed by another device or a group of devices separate from or including the device, such as a user device (e.g., the user device 105) and/or a video camera (e.g., the video camera 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an identifier associated with an object entering an area (block 510). For example, the device may receive a ticket identifier associated with a ticket and a vehicle identifier associated with a vehicle entering a parking area, as described above.

As further shown in FIG. 5, process 500 may include receiving video data tracking the object to a location in the area (block 520). For example, the device may receive video data tracking the vehicle to a parking spot in the parking area, as described above. In some implementations, receiving the video data tracking the vehicle to the parking spot in the parking area includes receiving the video data from a plurality of video cameras located at different locations of the parking area.

As further shown in FIG. 5, process 500 may include processing the video data, with an object detection model and a multiple object tracking model, to identify the location (block 530). For example, the device may process the video data, with an object detection model and a multiple object tracking model, to identify the parking spot and a parking spot location, as described above. In some implementations, processing the video data, with the object detection model and the multiple object tracking model, to identify the parking spot and the parking spot location includes combining the video data, from different video cameras located at different locations of the parking area, to track the vehicle through the parking area, and identifying the parking spot and the parking spot location based on combining the video data to track the vehicle through the parking area. In some implementations, combining the video data to track the vehicle through the parking area includes one or more of utilizing geometric constraints between positions of the different video cameras to combine the video data to track the vehicle through the parking area, or utilizing features of the vehicle to combine the video data to track the vehicle through the parking area.

In some implementations, processing the video data, with the object detection model and the multiple object tracking model, to identify the parking spot and the parking spot location includes determining the video data identifying the vehicle stopping at the parking area; identifying parameters of a video camera that generated the video data identifying the vehicle stopping at the parking area; and identifying the parking spot and the parking spot location based on the parameters of the video camera.

As further shown in FIG. 5, process 500 may include associating the identifier and the location (block 540). For example, the device may associate the ticket identifier, the vehicle identifier, and the parking spot location, as described above.

As further shown in FIG. 5, process 500 may include receiving, after associating the identifier and the location, a starting location of a user device associated with the object (block 550). For example, the device may receive, after associating the ticket identifier, the vehicle identifier, and the parking spot location, a starting location of a user device associated with a user of the vehicle, as described above. In some implementations, receiving the starting location of the user device includes receiving the starting location of the user device based on the user device scanning a code at the starting location.

As further shown in FIG. 5, process 500 may include receiving the identifier based on scanning the identifier with the user device (block 560). For example, the device may receive the ticket identifier based on the user scanning the ticket with the user device, as described above.

As further shown in FIG. 5, process 500 may include determining the location based on the identifier and based on associating the identifier and the location (block 570). For example, the device may determine the parking spot location based on the ticket identifier and based on associating the ticket identifier, the vehicle identifier, and the parking spot location, as described above.

As further shown in FIG. 5, process 500 may include processing the starting location and the location, with a path model, to calculate a navigation path from the starting location to the location (block 580). For example, the device may process the starting location and the parking spot location, with a path model, to calculate a navigation path from the starting location to the parking spot location, as described above. In some implementations, processing the starting location and the parking spot location, with the path model, to calculate the navigation path from the starting location to the parking spot location includes processing the starting location and the parking spot location, with a Dijkstra model, to calculate the navigation path from the starting location to the parking spot location.

As further shown in FIG. 5, process 500 may include providing the navigation path to the user device (block 590). For example, the device may provide the navigation path to the user device, as described above. In some implementations, providing the navigation path to the user device includes generating a user interface that includes the navigation path, a map of the parking area, and representation of the starting location, and providing the user interface to the user device. In some implementations, providing the navigation path to the user device includes generating a user interface that includes the navigation path, a map of the parking area, and a representation of a current location of the user device; providing the user interface to the user device; receiving sensor data associated with the user device; updating, based on the sensor data, the representation of the current location of the user device in the user interface to generate an updated user interface; and providing the updated user interface to the user device.

In some implementations, process 500 includes receiving sensor data from the user device, performing one or more indoor navigation techniques based on the sensor data to calculate a revised navigation path, and providing the revised navigation path to the user device. In some implementations, process 500 includes providing, to the user device, an instruction that instructs the user to scan the ticket with the user device.

In some implementations, process 500 includes providing one or more parking spot suggestions to other vehicles based on the vehicle exiting the parking area. In some implementations, process 500 includes receiving a code scan from the user device, determining a current location of the user device based on the code scan, calculating a revised navigation path based on the current location of the user device, and providing the revised navigation path to the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, a ticket identifier associated with a ticket and a vehicle identifier associated with a vehicle entering a parking area;

receiving, by the device, video data tracking the vehicle to a parking spot in the parking area;

processing, by the device, the video data, with an object detection model and a multiple object tracking model, to identify the parking spot and a parking spot location;

associating, by the device, the ticket identifier, the vehicle identifier, and the parking spot location;

receiving, by the device and after associating the ticket identifier, the vehicle identifier, and the parking spot location, a starting location of a user device associated with a user of the vehicle;

receiving, by the device, the ticket identifier based on the user scanning the ticket with the user device;

determining, by the device, the parking spot location based on the ticket identifier and based on associating the ticket identifier, the vehicle identifier, and the parking spot location;

processing, by the device, the starting location and the parking spot location, with a path model, to calculate a navigation path from the starting location to the parking spot location;

providing, by the device, the navigation path to the user device; and determining, by the device, to delete the video data based on determining the vehicle exited the parking area.

2. The method of claim 1, further comprising:

receiving sensor data from the user device;

performing one or more indoor navigation techniques based on the sensor data to calculate a revised navigation path; and providing the revised navigation path to the user device.

3. The method of claim 1, wherein receiving the video data tracking the vehicle to the parking spot in the parking area comprises:

receiving the video data from a plurality of video cameras located at different locations of the parking area.

4. The method of claim 1, wherein receiving the starting location of the user device comprises:

receiving the starting location of the user device based on the user device scanning a code at the starting location.

5. The method of claim 1, further comprising:

providing, to the user device, an instruction that instructs the user to scan the ticket with the user device.

6. The method of claim 1, wherein processing the video data, with the object detection model and the multiple object tracking model, to identify the parking spot and the parking spot location comprises:

combining the video data, from different video cameras located at different locations of the parking area, to track the vehicle through the parking area; and identifying the parking spot and the parking spot location based on combining the video data to track the vehicle through the parking area.

7. The method of claim 6, wherein combining the video data to track the vehicle through the parking area comprises one or more of:

utilizing geometric constraints between positions of the different video cameras to combine the video data to track the vehicle through the parking area; or utilizing features of the vehicle to combine the video data to track the vehicle through the parking area.

8. A device, comprising:

one or more processors configured to:

receive a ticket identifier associated with a ticket and a vehicle identifier associated with a vehicle entering a parking area;

receive, from a plurality of video cameras located at different locations of the parking area, video data tracking the vehicle to a parking spot in the parking area;

process the video data, with an object detection model and a multiple object tracking model, to identify the parking spot and a parking spot location;

associate the ticket identifier, the vehicle identifier, and the parking spot location;

receive, after associating the ticket identifier, the vehicle identifier, and the parking spot location, a starting location of a user device associated with a user of the vehicle;

receive the ticket identifier based on the user scanning the ticket with the user device;

determine the parking spot location based on the ticket identifier and based on associating the ticket identifier, the vehicle identifier, and the parking spot location;

process the starting location and the parking spot location, with a path model, to calculate a navigation path from the starting location to the parking spot location;

provide the navigation path to the user device; and determine to delete the video data based on determining the vehicle exited the parking area.

9. The device of claim 8, wherein the one or more processors, to process the video data, with the object detection model and the multiple object tracking model, to identify the parking spot and the parking spot location, are configured to:

determine the video data identifying the vehicle stopping at the parking area;

identify parameters of a video camera that generated the video data identifying the vehicle stopping at the parking area; and identify the parking spot and the parking spot location based on the parameters of the video camera.

10. The device of claim 8, wherein the one or more processors, to process the starting location and the parking spot location, with the path model, to calculate the navigation path from the starting location to the parking spot location, are configured to:

process the starting location and the parking spot location, with a Dijkstra model, to calculate the navigation path from the starting location to the parking spot location.

11. The device of claim 8, wherein the one or more processors, to provide the navigation path to the user device, are configured to:

generate a user interface that includes the navigation path, a map of the parking area, and representation of the starting location; and provide the user interface to the user device.

12. The device of claim 8, wherein the one or more processors, to provide the navigation path to the user device, are configured to:

generate a user interface that includes the navigation path, a map of the parking area, and a representation of a current location of the user device;

provide the user interface to the user device;

receive sensor data associated with the user device;

update, based on the sensor data, the representation of the current location of the user device in the user interface to generate an updated user interface; and provide the updated user interface to the user device.

13. The device of claim 8, wherein the one or more processors are further configured to:

provide one or more parking spot suggestions to other vehicles based on the vehicle exiting the parking area.

14. The device of claim 8, wherein the one or more processors are further configured to:

receive a code scan from the user device;

determine a current location of the user device based on the code scan;

calculate a revised navigation path based on the current location of the user device; and provide the revised navigation path to the user device.

15. A non-transitory computer-readable medium storing a set of instructions, the set of instructions comprising:

one or more instructions that, when executed by one or more processors of a device, cause the device to:

receive a ticket identifier associated with a ticket and a vehicle identifier associated with a vehicle entering a parking area;

receive video data tracking the vehicle to a parking spot in the parking area;

process the video data, with an object detection model and a multiple object tracking model, to identify the parking spot and a parking spot location;

associate the ticket identifier, the vehicle identifier, and the parking spot location;

receive a starting location of a user device associated with a user of the vehicle based on the user device scanning a code at the starting location;

provide, to the user device, an instruction that instructs the user to scan the ticket with the user device;

receive the ticket identifier based on the user scanning the ticket with the user device;

determine the parking spot location based on the ticket identifier and based on associating the ticket identifier, the vehicle identifier, and the parking spot location;

process the starting location and the parking spot location, with a path model, to calculate a navigation path from the starting location to the parking spot location;

provide the navigation path to the user device; and determine to delete the video data based on determining the vehicle exited the parking area.

16. The non-transitory computer-readable medium of claim 15, wherein the one or more instructions further cause the device to:

receive sensor data from the user device;

perform one or more indoor navigation techniques based on the sensor data to calculate a revised navigation path; and provide the revised navigation path to the user device.

17. The non-transitory computer-readable medium of claim 15, wherein the one or more instructions, that cause the device to process the video data, with the object detection model and the multiple object tracking model, to identify the parking spot and the parking spot location, cause the device to:

combine the video data, from different video cameras located at different locations of the parking area, to track the vehicle through the parking area; and identify the parking spot and the parking spot location based on combining the video data to track the vehicle through the parking area.

18. The non-transitory computer-readable medium of claim 15, wherein the one or more instructions, that cause the device to process the video data, with the object detection model and the multiple object tracking model, to identify the parking spot and the parking spot location, cause the device to:

determine the video data identifying the vehicle stopping at the parking area;

identify parameters of a video camera that generated the video data identifying the vehicle stopping at the parking area; and identify the parking spot and the parking spot location based on the parameters of the video camera.

19. The non-transitory computer-readable medium of claim 15, processing the starting location and the parking spot location, with the path model, to calculate the navigation path from the starting location to the parking spot location comprises:

process the starting location and the parking spot location, with a Dijkstra model, to calculate the navigation path from the starting location to the parking spot location.

20. The non-transitory computer-readable medium of claim 15, wherein the one or more instructions, that cause the device to provide the navigation path to the user device, cause the device to:

generate a user interface that includes the navigation path, a map of the parking area, and representation of the starting location; and provide the user interface to the user device.

* * * * *